Jan. 5, 1954
G. T. KODAMA
2,665,376
MULTIPLE ELECTRIC CAPACITOR
Filed July 20, 1948
2 Sheets-Sheet 1
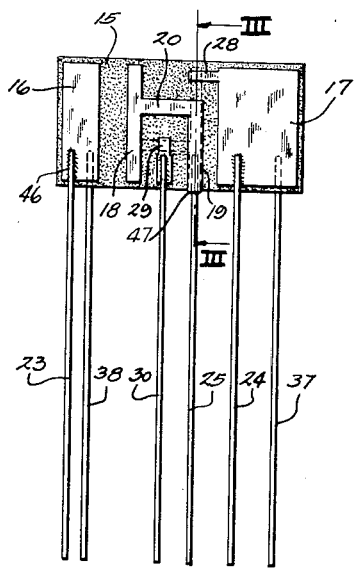
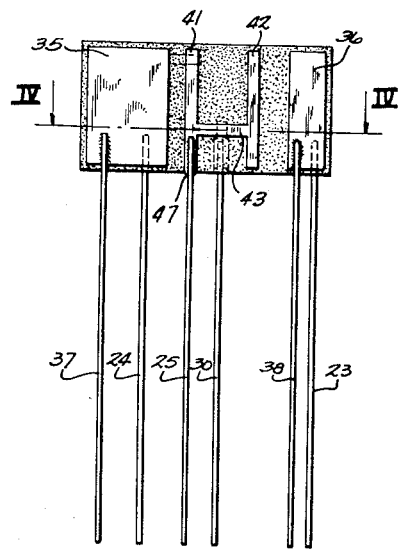
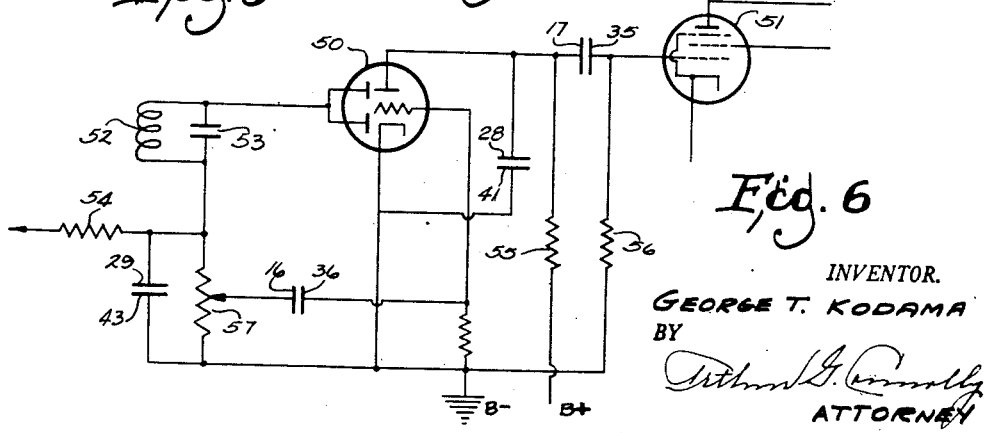
INVENTOR.
GEORGE T. KODAMA
BY
ATTORNEY Jan. 5, 1954  G. T. KODAMA  2,665,376
MULTIPLE ELECTRIC CAPACITOR
Filed July 20, 1948  2 Sheets-Sheet 2
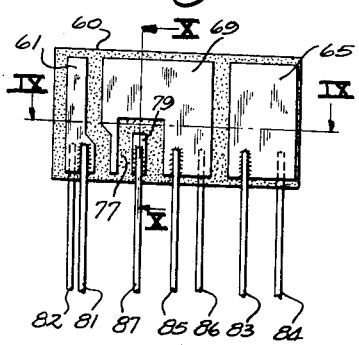
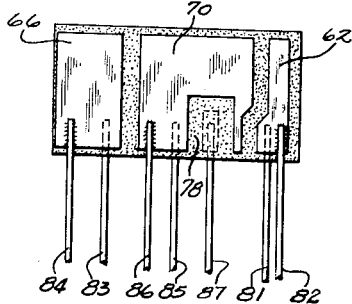
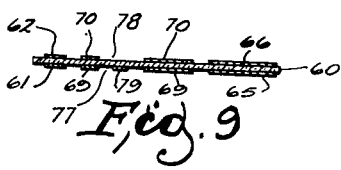
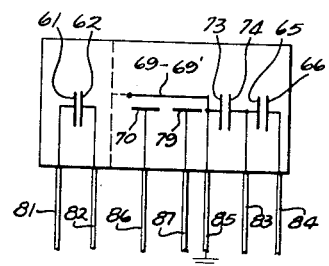
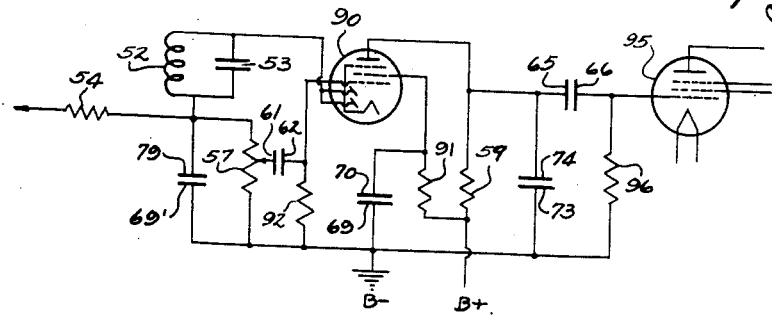
INVENTOR.
GEORGE T. KODAMA
BY
ATTORNEY Patented Jan. 5, 1954

2,665,376

UNITED STATES PATENT OFFICE 2,665,376

MULTIPLE ELECTRIC CAPACITOR

George T. Kodama, Milwaukee, Wis., assignor to Herlec Corporation, Milwaukee, Wis., a corporation of Wisconsin Application July 20, 1948, Serial No. 39,783

20 Claims. (Cl. 250—20)

This invention relates to improvements in components for electronic circuits and particularly to a multiple capacitor unit.

The demand for more compact electronic devices makes it desirable to combine a number of heretofore separate capacitors into a single unit to reduce the space requirements, to minimize the number of connections required in assembling the device and to reduce the possibilities of error in such assembly. However, such combined units can only be successful, if due attention is given to spatial arrangement of the capacitors so combined, or if some means is provided so that only predetermined inter-capacitor capacitance is obtained. Where two or more capacitors are formed on a single dielectric member with the plates in close proximity, it is impossible to avoid capacitance inter-coupling unless means are provided to shield at least some of such capacitors from one another.

It is, therefore, one object of the present invention to provide a component for electronic circuits in which a plurality of capacitors are combined into a single unit so related as to avoid undesired capacitance inter-coupling.

Another object of the invention is to provide a multi-capacitor unit for use in electronic circuits and in which one of the several capacitors is shielded from others of the capacitors.

Another object of the invention is to provide an electronic circuit component in which a single piece of dielectric is employed to serve as a support for conductive coatings forming capacitor plates and for other conductive coatings so arranged on the dielectric and so shaped as to prevent and obtain capacitance inter-coupling between the plates of selected ones of the several capacitors.

A further object of the invention is to provide a simple and cheap shielded multi-capacitor unit requiring a minimum number of connections for connecting the capacitor and the shielding plates to other portions of an electronic circuit.

Objects and advantages other than those above set forth will be apparent from the following description of my invention.

Generally, my novel multi-capacitor unit includes a dielectric which is preferably one of the known ceramic compositions having a high co-efficient of dielectric constant. These ceramics can be made relatively thin and light, while providing the surface area required. Pairs of conductive coatings are formed on opposite sides of the dielectric in such relation to each other as to form the plates of a plurality of capacitors extending relatively closely to one another. The coatings are formed by spraying metal, by applying a composition including a metal salt and reducing the salt to the metal by chemical means, heat, or otherwise by one of several other methods known to the art.

Inter-element capacitance is avoided by forming conductive coatings on the dielectric intermediate the capacitor plates and in such arrangement that a portion of the intermediate coatings form an inter-capacitance shield, when suitably connected to ground. The several capacitor plates and shield coatings are provided with leads for connection in an electronic circuit, the leads being such that the entire unit may be supported thereby in any desired spatial relation to other circuit elements.

Two embodiments of the present invention are illustrated in the accompanying drawings in which:

Fig. 1 is a plan view of one side of a multi-capacitor circuit component according to the present invention.

Fig. 2 is a plan view of another side of the circuit component of Fig. 1.

Fig. 3 is a sectional view on the plane of line III—III of Fig. 1.

Fig. 4 is a sectional view on the plane of line IV—IV of Fig. 2.

Fig. 5 is a diagram illustrating the connections of the several capacitors and the shielding of some of such capacitors from others thereof.

Fig. 6 is a portion of a circuit for a typical A.C.-D.C. type radio receiver and showing the application of the capacitor unit of the present invention therein.

Fig. 7 is a plan view of one side of a modified multi-capacitor circuit component according to the present invention.

Fig. 8 is a plan view of the other side of the circuit component of Fig. 7.

Fig. 9 is a sectional view on the plane of line IX—IX of Fig. 7.

Fig. 10 is a sectional view on the plane of line X—X of Fig. 7.

Fig. 11 is a diagram of connections, similar to Fig. 5, of the several capacitors and of the shielding action secured in the present structure; and Fig. 12 is a diagram of a portion of a battery or direct current energized radio receiver showing the application of the modified circuit component therein.

Referring first to Figs. 1 to 6 of the drawings, 15 designates a rigid but light dielectric which is represented as being a ceramic of high dielectric constant and of relatively small dimensions as now made, the actual length being of the order of one inch, the width being approximately one-half inch and the thickness being approximately $\frac{3}{32}$ inch. A plurality of conductive coatings are supported on each side of the dielectric to co-act in forming a plurality of capacitors, with the member 15 forming the dielectric for all of such capacitors and with the conductive coatings on the dielectric forming the capacitor plates.

Referring specifically to Fig. 1, plate 16 covers a considerable area adjacent one end of the dielectric 15 and extends substantially from edge to edge on one side of the dielectric while another plate 17 covers an area approximately three times that of plate 16 but adjacent the other end of the dielectric and likewise extends substantially from edge to edge.

Between plates 16 and 17 are placed a plurality of relatively narrow strip coatings connected in an h form with vertical bars 18, 19 and a cross-bar 20, bars 18 and 19 being spaced from the adjacent edge of plate 16 and the adjacent edge of plate 17 by a distance determined by capacity requirements. The h defines a dielectric surface area of considerable size for a purpose explained hereinafter. Leads 23 and 24 are connected respectively to plates 16 and 17 and a lead 25 is connected with strip coating 18, 19, 20 and to another coating to be described.

Plate 17 has a portion 28 extending from one edge for co-action with another coating to be described, and a further plate 29 is located between the bars 18, 19 and below the cross-bar 20 of the h shield and has connected thereto a lead 30.

Referring now to Fig. 2, it will be seen that plate 35 is co-extensive with plate 17 except for the portion 28 of plate 17, and that plate 36 is co-extensive with plate 16. Plates 35 and 36 have connected thereto respectively the leads 37 and 38. Plates 16 and 36 are thus paired to form one capacitor and plates 17 and 35 are paired to form another capacitor.

Another strip coating is placed between plates 35 and 36 in H form with vertical bars 41, 42 and a cross-bar 43. The H vertical bar 41 is so placed as to co-act with both h vertical bar 19 and the plate portion 28, and H vertical bar 42 is so placed as to co-act with h vertical bar 18, and H cross-bar 43 co-acts with a portion of plate 29. h bar 19 and H bar 41 are preferably connected by forming the coating around the edge of the dielectric.

The leads are connected to the plates by solder indicated at 46, and the solder preferably contains a sufficient quantity of the metal of which the coatings are formed, to avoid damaging such coatings during the soldering process. The various leads are individually connected to the several plates as above described, except that lead 25 may also be connected by solder around the edge of dielectric 15 between h bar 19 and H bar 41 as shown at 47 in Fig. 3.

The entire component may be coated with a thermosetting plastic 48 as shown in Fig. 3, if desired.

It will thus be seen that my new circuit component includes a first capacitor with plates 16 and 36, a second capacitor with plates 17 and 35, a third capacitor including plate portion 28 and the portion of H vertical bar 41 coinciding therewith, and a fourth capacitor including a portion of plate 29 and the portion of the H cross-bar 43 coinciding with the plate 29. Capacitor 16, 36 is wholly separate, while the remaining capacitors are so inter-connected as to have some common leads, as is shown in Fig. 5. It will thus be seen that capacitor 16, 36 is shielded from coupling with any of the other capacitors, and that inter-electrode capacitance is obtained between the plates so that only six leads are used for a total of four capacitors.

Fig. 6 shows the application of the new component to a typical A. C.-D. C. operated radio receiver including a duodiode triode tube 50 and a pentode tube 51. A transformer winding 52 is bridged by a separate capacitor 53, and the fixed resistances 54, 55 and 56 and variable resistor 57 complete the portions of the circuit to which the new component is applied. As shown the diodes of tube 50 are connected as rectifiers for demodulating the modulated radio signals which are received. Resistor 57 acts as the output load of the demodulated output signals provided by the rectifier. A variable potentiometer-type tap on this resistor supplies any desired portion of the rectifier output to the amplification stage operated with the triode section of tube 50. The output of this amplification stage is coupled to the input of the pentode amplification stage operated with tube 51. The circuit is well known and need not be further described. It will be noted that capacitor 29—43 provides carrier frequency filtering from the demodulated signals supplied by the rectifier, capacitor 16—36 couples the potentiometer tap to the triode amplifier, capacitor 17—35 couples the output of the triode amplifier to the input of the pentode amplifier, and the capacitor 28—41 is connected across the output of the triode amplifier as an additional filter.

Referring now to Figs. 7 to 12, inclusive, dielectric 60 is similar to dielectric 15, but the arrangement of the various plates thereon and the shielding and intercapacitor coupling are different from that in the preceding figures. A relatively small area plate 61 is formed adjacent one end of the dielectric and has opposed thereto, on the other side of the dielectric, a plate 62 of similar area to form a first capacitor. A materially larger plate 65 is formed adjacent the other end of the dielectric and is opposed by a similar plate 66 to form a second capacitor.

A relatively large plate 69 covers the major portion of the area between plates 61, 65 on one side of the dielectric 60 and such plate 69 is opposed by a similar plate 70 between plates 62, 66 on the other side of the dielectric to form a third capacitor. The edges of plates 69 and 70 are relatively closely adjacent the edges of plates 65 and 66, so that a desired inter-electrode capacitance is obtained between capacitor plates 65, 66 and ground, as indicated in Fig. 11 at 73 and 74. Plates 69 and 70 substantially inclose dielectric surface areas of considerable size extending from one edge of the dielectric and in corresponding positions, and a plate 79 of relatively small area is formed substantially centrally in area 77. Such plate 79 has an edge effect with plate 69, as though plate 79 co-acted with a separate plate (indicated in Figs. 11 and 12 as 69') to form a fourth capacitor even though only one plate is provided especially for such capacitor.

Plates 61, 62 are respectively connected with leads 81, 82. Plates 65, 66 are severally connected with leads 83, 84. Plates 69, 70 are severally connected with leads 85, 86, and a lead 87 is connected with plate 79.

By reference to Fig. 11, it will be seen that capacitor 61, 62, is shielded from capacitor 65, 66, by the intervening capacitor 69, 70. Plates 65 and 66 have edge effects respectively with plates 69 and 70 and in effect form a capacitor indicated as 73, 74 in Figs. 11 and 12. Plate 79 has edge effect with plate 69 and in effect forms a capacitor indicated as 69', 79, also in Figs. 11 and 12. It will be seen from Fig. 11 that the seven capacitor electrodes are so interlinked capacitively, that five different effective capacitors are provided.

In the diagram of Fig. 12, the components similar to those shown in Fig. 6 are designated by similar reference numerals and need not be here particularly described. However, being direct current powered, the present receiver employs a duodiode pentode tube 90 which includes a screen grid requiring a resistor 91 in addition to resistor 59 and a resistor 92 connected with the control grid of such tube, and a pentode tube 95 having a grid connected with the B− or grounded terminal by way of resistor 96. The various plates of the several capacitors are designated by the same reference numerals as in Fig. 11 and the capacitive effect obtained from inter-coupling of some plates of the modified structure, are also designated as in such figure.

It will thus be seen that each embodiment of the invention provides a first capacitor, namely, capacitors 16, 36 and 61, 62 respectively, of which the co-acting plates are similar in area and shape and are formed adjacent one end of the dielectric and on opposite sides thereof in coinciding or superposed relation. Capacitors 17, 35 and 65, 66 severally form a second capacitor of which the co-acting plates are formed adjacent the other end and on opopsite sides of the dielectric, the plates 65, 66 being similar in area and shape, while plate 17 has a projection that does not coincide with plate 35.

In the first embodiment of the invention a plurality of conductive coatings are formed on two sides of the dielectric to function in part as capacitor plates and in part as grounded conductive coatings for shielding one of the capacitors against coupling with the other capacitors. In the second embodiment of the invention, three coatings are employed and two of the coatings define a substantial area of the dielectric surface on which the third coating is placed with the edges of one of the said two coatings adjacent the three sides of the third coating.

In the first embodiment, capacitor plate extension 28 and coating bar 41 co-act to form the third capacitor, plate 29 co-acts with coating bar 43 to form the fourth capacitor and the remaining coating bars 18 and 42 form a shield between the first capacitor and the group comprising the second, third and fourth capacitors. The group of capacitors is capacitively inter-coupled so that only four terminals are required for the three capacitors of such group.

In the second embodiment, plates 69 and 70 form the third capacitor and define a dielectric surface area 78 in which the plate 79 is placed. Hence, plate 79 co-acts edgewise with plate 69 to form a fourth capacitor indicated as 69', 79. In such second embodiment, plates 65 and 69 co-act and plates 66, 70 co-act, respectively, with one another in effect, to produce an inter-coupling which is shown as capacitor 73, 74. Hence, the second embodiment also has the effect of shielding capacitors from each other and by reason of the inter-coupling, only seven terminals are required for the five capacitors.

As many apparently widely different embodiments of the invention may be made without departing from the spirit and scope hereof, it is to be understood that the invention is not limited to its specific embodiments except as defined in the appended claims.

I claim:
1. In a multi-capacitor unit for electric circuits, a dielectric sheet, a plurality of conductive coatings on opposite sides of the dielectric to co-act in forming a plurality of electrically independent capacitors, interconnected conductive coatings formed on opposite sides of the dielectric intermediate the capacitors shielding the capacitors from each other, and an additional conductive coating positioned adjacent the intermediate coatings and cooperating through said dielectric with one of said intermediate coatings to form another capacitor.

2. In a multi-capacitor unit for electric circuits, a dielectric sheet having a high dielectric constant, a plurality of spaced conductive coatings on opposite sides of the dielectric and co-acting through said dielectric in forming a first and second capacitor spaced from each other, conductive strips in h and ⱨ shape severally formed on opposite sides of the dielectric intermediate said first and second capacitors and connected with each other to shield the first and second condensers from each other, and a conductive coating on one side of the dielectric co-acting with the interconnected strips in forming a third capacitor and positioned between parallel sections of one of said strips, the h and ⱨ strips forming a shield between the third capacitor and the other capacitors.

3. In a radio receiver circuit having a rectifier stage connected for demodulating signals and an amplification stage connected for amplifying the demodulated signals, the combination of a potentiometer resistor connected as the output load for the demodulated signal output of the rectifier stage and having a tap for supplying a desired portion of this output to the amplification stage, an integral multi-capacitor unit having a single dielectric sheet provided with a plurality of spaced electrically conductive coatings on its opposite faces, a first pair of said coatings providing a first capacitance, terminal means in said circuit connecting said first capacitor across said rectifier output, a second pair of said coatings providing a second capacitance, further terminal means in said circuit connecting said second capacitor for coupling the demodulated signals from the potentiometer tap to the amplification stage, and a third pair of said coatings spaced from the second pair and providing a third capacitance, and an additional terminal means in said circuit connecting said third capacitor as an output coupling for the output of the amplification stage, said first pair of coatings being positioned between said second pair and said third pair as a shield decoupling the second and third capacitances from each other.

4. The combination as defined by claim 3 in which the shield is a grounded coating juxtaposed on one side of said dielectric sheet adjacent a portion of one of said other pairs of coatings and providing an additional capacitance connected across the output of the amplification stage.

5. In a multi-capacitor unit for electric circuits, a high dielectric constant ceramic sheet of miniature size, a plurality of spaced conductive coatings on opposite sides of the dielectric co-acting to form two spaced electrically independent capacitors, a pair of intermediate conductive coatings formed on opposite sides of the dielectric between the said capacitors shielding the same from each other, and terminal means connected to each intermediate coating to provide an effective grounding connection, the said terminal means including a conductive coating extending across an edge of the dielectric and conductively interconnecting the said intermediate coatings together, and a single lead extending from one of said intermediate coatings.

6. In a multi-capacitor unit for electric circuits, a high dielectric constant ceramic sheet of miniature size, a plurality of spaced conductive coatings on opposite sides of the dielectric co-acting to form two spaced electrically independent capacitors, a pair of intermediate conductive coatings formed on opposite sides of the dielectric between the said capacitors shielding the same from each other, and terminal means connected to each intermediate coating to provide an effective grounding connection, one of said intermediate coatings being positioned to adjacently oppose one of said other coatings and capacitively connected through edge coupling therewith to provide a further capacitor, an additional coating on one side of said dielectric and opposing a portion of one said intermediate coating to form a still further capacitor through said dielectric, said terminal means including a single lead depending from each of said plurality of coatings and said additional coating, and lead means depending from said intermediate coatings so that there are only two less capacitors than there are leads on said unit.

7. The combination set forth in claim 5 including an additional conductive coating juxtaposed adjacent said shielding conductors on one side of said dielectric to cooperate with a portion of said shielding conductors to form another capacitor.

8. The combination set forth in claim 7 in which one shield coating has a U-shaped portion and said additional coating is positioned within and shielded by said U-shaped portion of said shielding coating.

9. The combination set forth in claim 1 in which the intermediate coatings have substantially U-shaped portions, one of which substantially surrounds the said additional coating.

10. The combination set forth in claim 1 in which the said intermediate coatings substantially surround said additional coating.

11. The combination set forth in claim 1 in which one of said plurality of coatings has an abutting portion overlying a portion of the said intermediate coating on the opposite side of the dielectric to form therewith a further capacitor.

12. The combination set forth in claim 11 including a single lead extending from each of said plurality of coatings and said additional coating, and a single lead extending from said inter-connected coatings so that there are only two more leads than there are capacitors on said unit.

13. A multi-capacitor unit consisting of a miniature type thin dielectric sheet having a high dielectric constant, a plurality of conductive coatings deposited on opposite faces of said sheet, said plurality of coatings including a pair of opposed coatings of similar configuration deposited at each end of said dielectric on its opposing faces and an intermediate shielding coating having a portion of substantially U shape, a further conductive coating being deposited on one side of said dielectric intermediate said two end coatings and substantially encompassed by said U-shaped coating, said U-shaped coating being positioned adjacent one end coating to form therewith capacitive inter-coupling to produce a further capacitor, and terminal means connected with each of said coatings.

14. In a radio receiver circuit having a rectifier stage connected for demodulating signals, and amplification stages connected for amplifying the demodulated signals, the combination of a potentiometer resistor connected as the output load for the demodulated signal output of the rectifier stage, and having a tap for supplying a portion of that output to one amplification stage, said stage including an electron discharge tube having a screen grid electrode, an integral multi-capacitor unit having a single dielectric sheet provided with a plurality of spaced conductive coatings on its opposite faces paired to form multiple capacitors, one end pair of said coatings providing a first capacitance terminal means connecting said first capacitor to couple the demodulated signals from the potentiometer tap to the amplification stage, a second end pair of coatings providing a second capacitance further terminal means connecting said second capacitor to couple the output of the said one amplification stage to a further amplification stage, said coatings further including an opposed pair of intermediate coatings forming a third capacitance, and additional terminal means connecting said third capacitance to said one amplification stage as a screen grid by-pass, said intermediate coatings being closely spaced to one of said pair of end coatings to produce capacitive edge coupling therebetween inherently connected as a filtering capacitor for the output of the said one amplification stage.

15. In a radio receiver circuit having a rectifier stage connected for demodulating signals and an amplification stage connected for amplifying the demodulated signals, the combination of a potentiometer resistor connected as the output load for the demodulated signal output of the rectifier stage and having a tap for supplying a desired portion of this output to the amplification stage, an integral multi-capacitor unit having a single dielectric sheet provided with a plurality of spaced electrically conductive coatings on its opposite faces, a first pair of said coatings providing a first capacitor, terminal means in said circuit connecting said first capacitor for coupling the demodulated signals from the potentiometer to the amplification stage, a second pair of said plurality of coatings spaced from the first pair on said dielectric and providing a second capacitor terminal means in said circuit connecting said second capacitor as an output coupling for the output of the amplification stage, and a third pair of coatings deposited on opposite sides of said dielectric intermediate said first two pairs as a shield barrier against capacitive coupling between said first two pairs.

16. The combination of claim 15 in which a portion of said shield barrier is positioned opposite one coating of said two pairs and conected therewith through said dielectric to provide a further capacitor inherently connected across the output of the amplification stage.

17. A radio receiver circuit as set forth in claim 15 in which at last one of said third pair of coatings is connected to ground.

18. A multi-capacitor unit consisting of a miniature type thin dielectric sheet having a high dielectric constant, a plurality of conductive coatings deposited on opposite faces of said sheet, said plurality of coatings including a pair of opposed coatings of similar configuration deposited adjacent the periphery of said dielectric on its opposing faces and a central shielding coating having a portion of substantially U-shape, at least one further conductive coating being deposited on one side of said dielectric and substantially encompassed by said U-shaped coating.

19. The combination set forth in claim 18 in which said one further conductive coating has an effective capacitive edge coupling with said shielding coating to produce an effective additional capacitance without requiring an additional lead therefor.

20. In a multi-capacitor unit for electric circuits, a dielectric sheet, a pair of spaced conductive coatings on each side of the dielectric, the respective opposing coatings being similar in area and shape, said coacting pairs forming spaced first and second capacitors, respectively, three additional conductive coatings formed on said dielectric intermediate the first and second capacitors and respectively cooperating together and with one of said respective opposing coatings through said dielectric sheet to form a third, a fourth, and a fifth capacitor, one of said intermediate coatings being spaced from but substantially encompassed by said second intermediate coating on one side of the dielectric, and at least one of said intermediate coatings being so shaped as to form a shield for protecting at least three of the said capacitors from intercoupling with each other when the same is grounded.

GEORGE T. KODAMA.

References Cited in the file of this patent

UNITED STATES PATENTS

| Number | Name | Date |
| --- | --- | --- |
| 2,364,238 | Nicholson | Dec. 5, 1944 |
| 2,474,988 | Sargrove | July 5, 1949 |
| 2,544,508 | Mackey | Mar. 6, 1951 |

FOREIGN PATENTS

| Number | Country | Date |
| --- | --- | --- |
| 474,754 | Great Britain | Nov. 5 1937 |

OTHER REFERENCES

Printed Vitreous Enamel Components: Bradford et al. Electronics, for December 1947 (vol. 20, No. 12), pages 106, 107, 108.

"Tele-Tech," August 1947, pages 52, 53, 96, 97.